United States Patent
Walter (10) Patent No.: US 11,767,096 B2
(45) Date of Patent: Sep. 26, 2023

(54) SYSTEMS AND METHODS FOR INDICATING RELEASE OF A CANOPY OF AN AIRCRAFT

(71) Applicant: THE BOEING COMPANY, Chicago, IL (US)

(72) Inventor: Matthew W. Walter, Troy, MO (US)

(73) Assignee: THE BOEING COMPANY, Chicago, IL (US)

( * ) Notice: Subject to any disclaimer, the term of this patent is extended or adjusted under 35 U.S.C. 154(b) by 20 days.

(21) Appl. No.: 17/530,607

(22) Filed: Nov. 19, 2021

(65) Prior Publication Data
US 2022/0250733 A1 Aug. 11, 2022

Related U.S. Application Data

(60) Provisional application No. 63/146,053, filed on Feb. 5, 2021.

(51) Int. Cl.
*B64C 1/32* (2006.01)
*B64C 1/14* (2006.01)

(52) U.S. Cl.
CPC .............. *B64C 1/32* (2013.01); *B64C 1/1476* (2013.01)

(58) Field of Classification Search
CPC ......... B64C 1/32; B64C 1/1476; B64D 25/10; B64D 25/12; E05B 2047/0067; E05B 2047/0068; H01H 3/16; H01H 3/161; H01H 3/162
See application file for complete search history.

(56) References Cited

U.S. PATENT DOCUMENTS

| 2,832,553 | A * | 4/1958 | Wallenhorst | B64C 1/32 244/121 |
| 6,796,528 | B2 * | 9/2004 | Wood | B64C 1/1476 244/129.4 |
| 10,663,321 | B1 * | 5/2020 | Martin | G01D 5/241 |

FOREIGN PATENT DOCUMENTS

CN        111377048 A    *    7/2020

OTHER PUBLICATIONS

Machine Translation of CN-111377048-A, Guan W, Jul. 2020 (Year: 2020).*

* cited by examiner

*Primary Examiner* — Tien Q Dinh
*Assistant Examiner* — Katherine June Bolek
(74) *Attorney, Agent, or Firm* — The Small Patent Law Group LLC; Joseph M. Butscher (57) ABSTRACT

A system for initiating a canopy release signal for a canopy of an aircraft includes a first striker secured to the canopy, and a first initiator assembly secured to a fuselage of the aircraft. The first initiator assembly has a protrusion. The first striker is configured to be rotated against the protrusion of the first initiator assembly. The canopy release signal is output in response to the first striker rotating against the protrusion of the first initiator assembly.

14 Claims, 9 Drawing Sheets

SYSTEMS AND METHODS FOR INDICATING RELEASE OF A CANOPY OF AN AIRCRAFT

RELATED APPLICATIONS

This application also relates to and claims priority benefits from U.S. Provisional Patent Application No. 63/146,053, entitled "Systems and Methods for Indicating Release of a Canopy of an Aircraft," filed Feb. 5, 2021, which is hereby incorporated by reference in its entirety.

This invention was made with Government support under contract number 18-D-0107 awarded by the U.S. Department of Defense. The government has certain rights in this invention.

FIELD OF THE DISCLOSURE

Embodiments of the present disclosure generally relate to systems and methods for indicating release of a canopy from a fuselage of an aircraft.

BACKGROUND OF THE DISCLOSURE

Certain aircraft include a canopy over a cockpit. For example, various military fighter jets include a canopy over a cockpit. The canopy is moveable between an open position, which allows a pilot to enter and exit the cockpit, and a closed position, such as during flight of the aircraft.

During a mission, a pilot may need to eject from the cockpit. For example, the aircraft may be impacted by adversarial ordnance, which may render the aircraft inoperable. As the pilot pulls an ejection seat firing handle to initiate an escape system, a transparency of the canopy is weakened or removed before the seat assembly, on which the pilot is seated, is ejected from the cockpit.

During an ejection sequence, before a seat supporting an occupant of a cockpit is ejected, the canopy is typically released or otherwise jettisoned from the aircraft in order to prevent the occupant and/or seat from colliding with the canopy. As the canopy pivots to a position relative to the fuselage at which a path for ejection of the seat is clear, a signal is sent (for example, a "canopy gone" signal) that initiates a seat ejection.

Typically, a system for sending the canopy gone signal includes one or more coiled lanyards attached to both a fuselage and the canopy. Once the canopy rotates to a specific angle in the jettison sequence, the lanyard extends and become taut. The taut lanyard pulls a plunger on a pyrotechnic or electrical device sending the canopy gone signal.

However, a need exists for a simpler and more efficient system as compared to one that includes the coiled lanyards.

SUMMARY OF THE DISCLOSURE

A need exists for a system and a method for effectively and accurately outputting a signal indicating that a canopy has cleared a space for ejecting a seat from a cockpit of an aircraft during an emergency ejection procedure. Further, a need exists for such system and method that is not susceptible to a potential of other structures of an aircraft interfering therewith.

With those needs in mind, certain embodiments of the present disclosure provide a system for initiating a canopy release signal for a canopy of an aircraft. The system includes a first striker secured to the canopy, and a first initiator assembly secured to a fuselage of the aircraft. The first initiator assembly has a protrusion. The first striker is configured to be rotated against the protrusion of the first initiator assembly. The canopy release signal is output in response to the first striker rotating against the protrusion of the first initiator assembly.

In at least one embodiment, the system also includes a second striker secured to the canopy. The second striker is opposite from the first striker. A second initiator assembly is secured to the fuselage. The second initiator assembly is opposite from the first initiator assembly.

As an example, the first striker is secured to a pivot assembly of the canopy. As a further example, the first striker is secured to a first hinge of the pivot assembly.

In at least one embodiment, the protrusion includes an arcuate fore face. The first striker is configured to be rotated against the arcuate fore face.

In at least one embodiment, the first initiator assembly includes a housing defining a keyway, and a sliding bolt slidably retained within the keyway. The sliding bolt includes the protrusion.

As a further example, the first initiator assembly also includes an initiator having a plunger. The plunger is coupled to the sliding bolt. A signal transfer line is coupled to the initiator. The canopy release signal is output through the signal transfer line. In at least one embodiment, the striker is configured to push the protrusion rearwardly, thereby causing the sliding bolt to rearwardly slide through the keyway, which, in turn, pulls the plunger, and actuates the initiator to send the canopy release signal via the signal transfer line.

In at least one embodiment, the first striker rotates against the protrusion at a canopy release angle. The canopy release angle is between a canopy locked reference line and a release line. As an example, the canopy release angle is 72.5 degrees.

Certain embodiments of the present disclosure provide a method for initiation of a canopy release signal for a canopy of an aircraft. The method includes securing a first striker to the canopy, and securing a first initiator assembly to a fuselage of the aircraft. The first initiator assembly has a protrusion. The first striker is configured to be rotated against the protrusion of the first initiator assembly. The canopy release signal is output in response to the first striker rotating against the protrusion of the first initiator assembly.

Certain embodiments of the present disclosure provide an aircraft including a fuselage. A canopy is moveably coupled to the fuselage. The canopy is configured to be move between an open position and closed position. The canopy includes a transparent cover secured to a frame, and a pivot assembly extending from the frame. The aircraft further includes a system for initiating a canopy release signal for the canopy of the aircraft, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a system and a method for initiating a canopy release signal (for example, a "canopy gone" signal). The system and method does not utilize lanyards, which are subject to the drawbacks noted above. Instead, the system and method include a striker plate disposed on a portion of a canopy (such as a pivot assembly). The striker plate is configured to interact with a sliding bolt secured to another portion of the aircraft, such as the fuselage proximate to the canopy. In at least one embodiment, the sliding bolt is slidably retained within a keyway of an initiating assembly.

In at least one embodiment, the initiating assembly having the keyway is permanently fixed to aircraft structure. Further, the initiating assembly also includes a flange or bracket that allows a mechanical pyrotechnic initiator to mount directly to the initiating assembly. The pyrotechnic initiator includes a protruding plunger that once pulled, activates an explosive charge that sends or otherwise outputs the canopy release signal. The plunger extends into a hole within the sliding bolt. A pin or fastener is inserted through a hole in the sliding bolt and through the plunger such that when the sliding bolt slides in the keyway, the plunger is pulled and/or extended in a linear orientation that is aligned with the plunger axis. In normal conditions, the sliding bolt and initiator plunger reside stationary and undisturbed. However, during a canopy jettison event, the sliding bolt is forced to slide within the keyway such that the plunger is pulled, and the explosive signal is initiated. Accordingly, the sliding bolt has an outwardly-extending protrusion or a boss, such as can extend laterally outboard. The striker also has a protruding striking face that extends laterally inboard such that when the canopy reaches a specific angle of rotation, the striker plate contacts the sliding bolt protrusion, which in turn slides the bolt within the keyway, and then activates the mechanical initiator.

Compared to the known lanyard system and method, embodiments of the present disclosure provide systems and methods in which the initiator plunger is not susceptible be being pulled at an adverse angle. The keyway constrains the motion and force along the axis of the initiator plunger. Further, there is little to no risk of entanglement with the ejection seat, as there are no free-swinging lanyards. Further, there is little to no risk of entanglement with aircraft structure because there are no lanyard coils to catch or hang on surrounding structure. For redundancy, the system can include the components on both sides of a canopy, such as on a first hinge and a second hinge.

Figure 1:
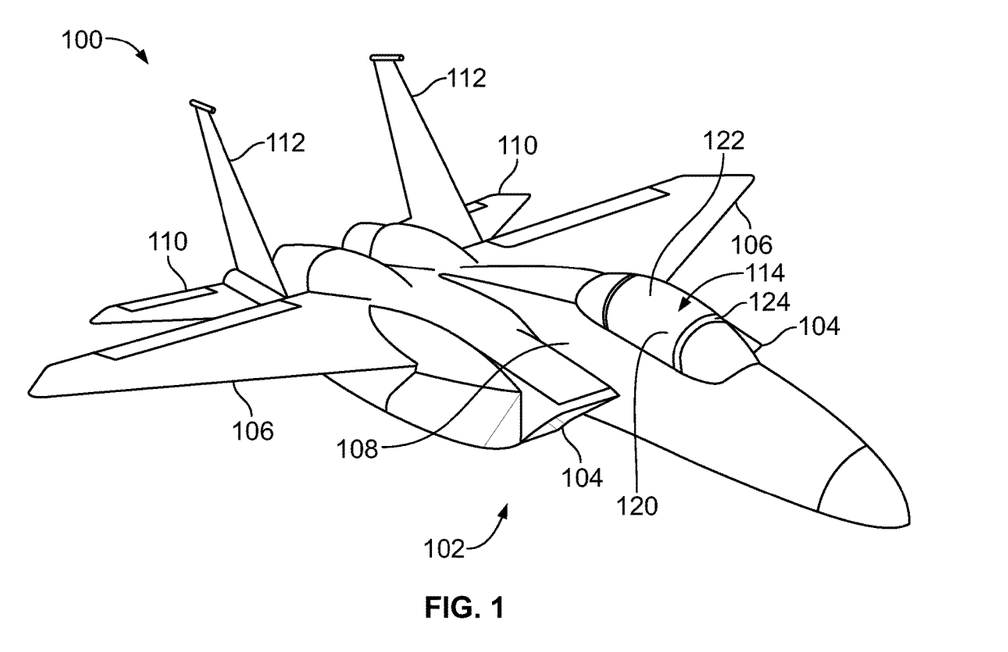
FIG. 1 illustrates a perspective front view of an aircraft, according to an embodiment of the present disclosure.

FIG. 1 illustrates a perspective front view of an aircraft 100, according to an embodiment of the present disclosure. As shown, the aircraft 100 is a military fighter jet. The aircraft 100 includes a propulsion system 102 that includes two engines 104, for example. Optionally, the propulsion system 102 may include more or less engines 104 than shown. The engines 104 are carried by wings 106 and/or a fuselage 108 of the aircraft 100. In other embodiments, the engines 104 may be carried by other portions of the aircraft 100. The fuselage 108 also supports horizontal stabilizers 110 and vertical stabilizers 112. The fuselage 108 of the aircraft 100 includes the cockpit 114 covered by a canopy 120. Optionally, the aircraft 100 may be various other types of military aircraft. Alternatively, the aircraft may be various types of commercial aircraft.

The canopy 120 includes a transparent cover 122 secured to a frame 124. The transparent cover 122 is formed of a robust, sturdy, and transparent material, such as acrylic. The frame 124 may be formed of metal. The canopy 120 is moveable between an open position, in which a pilot may enter and exit the cockpit, and a closed position, such as during flight of the aircraft 100.

The cockpit 114 includes a seat assembly (not shown). In at least one embodiment, the assembly includes pyrotechnic components, such as rockets, integrated therein, to allow for ejection of the seat assembly. An eject mechanism (not shown) is disposed within the cockpit 114. The eject mechanism may be secured to a portion of the seat assembly. The eject mechanism may be an eject handle or button, for example.

Figure 2:
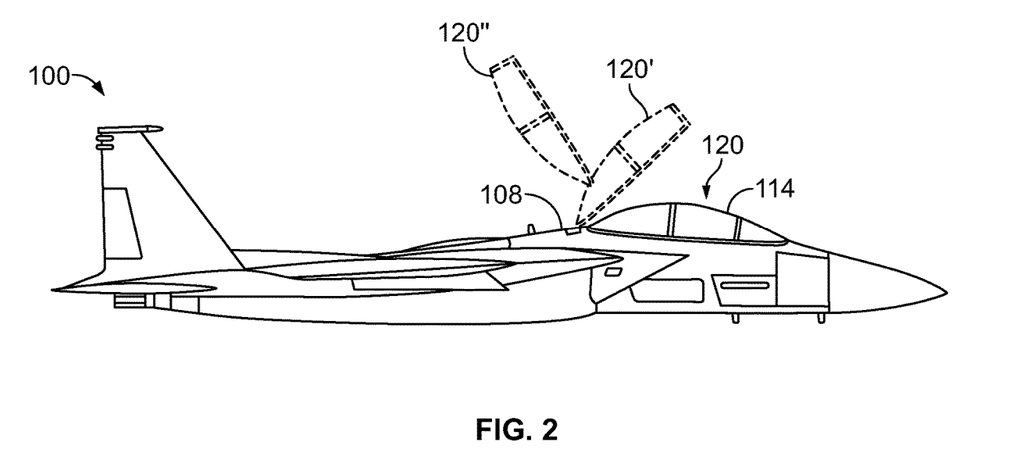
FIG. 2 illustrates a lateral view of the aircraft of FIG. 1.

FIG. 2 illustrates a lateral view of the aircraft 100 of FIG. 1. During an emergency ejection process, the canopy 120 is jettisoned to ensure a safe, unimpeded path for the ejection of the seat(s) that support the occupant(s). As an example, during the ejection process, an occupant (such as a pilot) pulls an ejection seat handle within the cockpit 114. In response, the canopy 120 linearly translates to unlock, such as via pyrotechnic thrusters. The canopy 120 rotates about aircraft pivot pins, such as via canopy jettison rocket motors or other pyrotechnic devices to rotate rearwardly to positions 120' and 120", for example. A signal indicating an ejection sequence is sent. For example, the signal is a canopy release signal, such as a "canopy gone" signal indicating that the canopy has cleared sufficient space in relation to the cockpit for the seat to be safely ejected from the cockpit. The signal indicates that the canopy 120 has rotated to a predetermined angle to trigger a seat firing sequence. The seat(s) and occupant(s) are then ejected.

Figure 3:
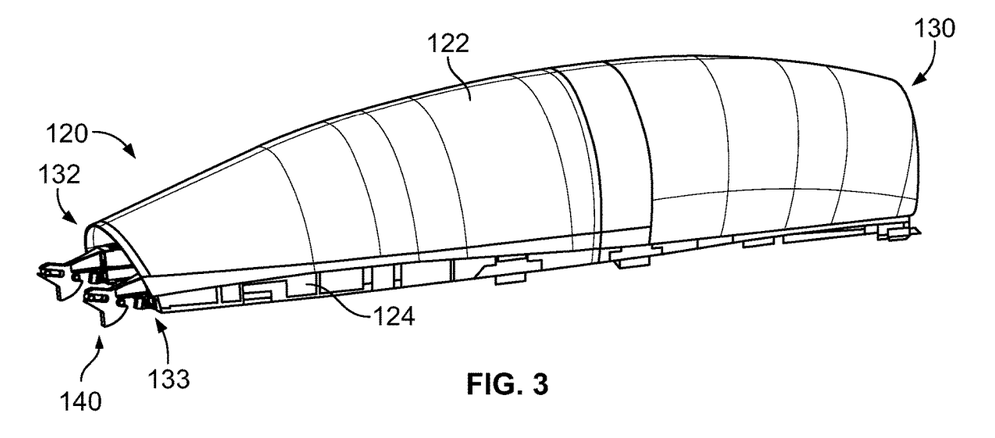
FIG. 3 illustrates a perspective lateral view of a canopy, according to an embodiment of the present disclosure.

FIG. 3 illustrates a perspective lateral view of the canopy 120, according to an embodiment of the present disclosure. The canopy 120 includes the transparent cover 122 coupled to the frame 124. The canopy 120 includes a fore end 130 and an aft end 132 that is opposite from the fore end 130.

A pivot assembly 140 connects to the frame 124. For example, the pivot assembly 140 rearwardly extends from an aft end 133 of the frame 124. Referring to FIGS. 1-3, the pivot assembly 140 pivotally connects to portions of the fuselage 108 to allow the canopy 120 to open and close relative to the fuselage 108. In at least one embodiment, the pivot assembly 140 pivotally couples to pivot pins of the fuselage 108.

Figure 4:
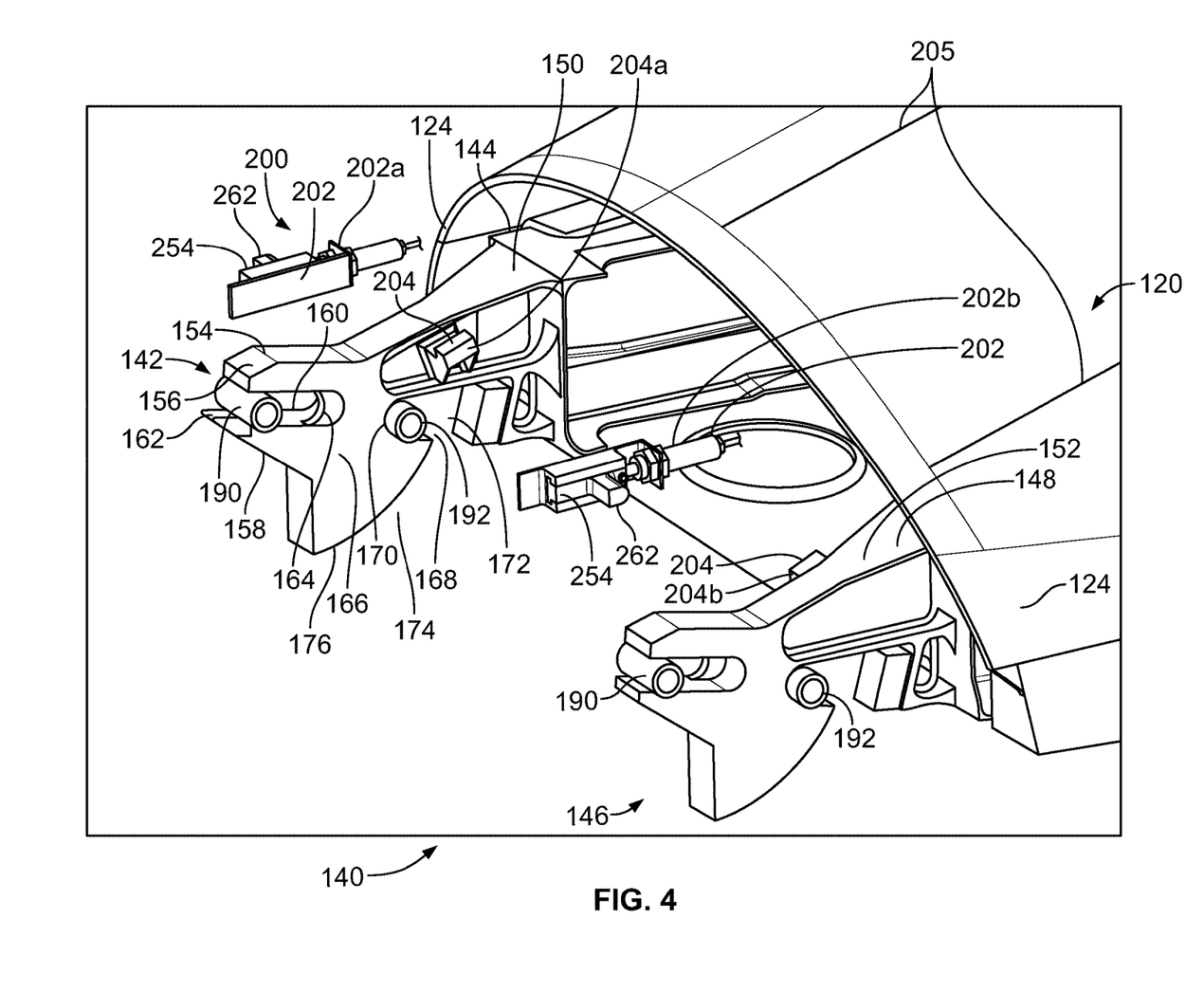
FIG. 4 illustrates a perspective lateral view of a pivot assembly of the canopy, according to an embodiment of the present disclosure.

FIG. 4 illustrates a perspective lateral view of the pivot assembly 140 of the canopy 120, according to an embodiment of the present disclosure. The pivot assembly 140 includes a first hinge 142 extending rearwardly from a first side 144 of the frame 124, and a second hinge 146 extending rearwardly from a second side 148 of the frame 124. The first hinge 142 is opposite from the second hinge 146. That is, the first hinge 142 is on a first side of the canopy 120, and the second hinge 146 is on an opposite second side of the canopy 120. The first hinge 142 can connect to the frame 124 through a first extension beam 150, and the second hinge 146 can connect to the frame 124 through a second extension beam 152. Optionally, the first hinge 142 and the second hinge 146 can connect to the frame 124 without extension beams.

The first hinge 142 includes a fork 154 having an upper prong 156 separated from a lower prong 158 by a pivot slot 160 having an open aft end 162 and a closed fore end 164. The fork 154 connects to an intermediate body 166 having a locking slot 168 having a closed aft end 170 and an open fore end 172. A hinge cam 174 having an outer arcuate surface 176 extends from (such as below) the intermediate body 166. The second hinge 146 is similarly configured.

Referring to FIGS. 1-4, the fuselage 108 includes aft pins 190 and fore pins 192. The aft pins 190 and the fore pins 192 are fixed structures of the fuselage 108 onto which the pivot assembly 140 secures. The pivot assembly 140 secures to the aft pins 190 and the fore pins 192. For example, the pivot slots 160 of the first hinge 142 and the second hinge 142 retain the aft pins 190. The locking slots 168 retain fore pins 192 (for example, a cam roller).

A system 200 for initiating a canopy release signal includes an initiating assembly 202 secured to a portion of an airframe. For example, the initiating assembly 202 is fixed to a portion of the fuselage 108 proximate to where the pivot assembly 140 secures to the fuselage 108. The system 200 further includes a striker 204 secured to a portion of the pivot assembly 140. For example, the striker 204 can be secured to the first extension beam 150. Optionally, the striker 204 can be secured to other portions of the pivot assembly 140, such as the intermediate body 166.

In order to provide signal output redundancy, in at least one embodiment, the system 200 includes a first initiating assembly 202a, a first striker 204a, a second initiating assembly 202b, and a second striker 204b. The first initiating assembly 202a extends inwardly from the fuselage 108 proximate to the first side 144, and the second initiating assembly 202b extends inwardly from the fuselage 108 proximate to the second side 146 opposite from the first initiating assembly 202a. In at least one embodiment, the first initiating assembly 202a and the second initiating assembly 202b mirror one another. The first striker 204a extends inwardly toward a central plane 205 of the canopy 120. The second striker 204b extends inwardly toward the central plane 205 of the canopy 120 opposite from the first striker 204a. In at least one embodiment, the first striker 204a and the second striker 204b mirror one another. Alternatively, the system 200 may include one initiating assembly 202 and one striker 204 on the first side 144 or the second side 148.

As described herein, embodiments of the present disclosure provide the system 200 for initiating a canopy release signal for the canopy 120 of the aircraft 100. The system 200 includes the first striker 204a secured to the canopy 120, and the first initiator assembly 202a secured to the fuselage 108 of the aircraft 100. The first striker 204a is configured to be rotated into a protrusion 262 of the first initiator assembly 202a. The canopy release signal is output in response to the first striker 204a rotating against the protrusion 262 of the first initiator assembly 202a. In at least one embodiment, the system 200 also includes the second striker 204b secured to the canopy 120. The second striker 204b is opposite from the first striker 204a (for example, on different sides of the canopy 120). A second initiator assembly 202b is secured to the fuselage 108. The second initiator assembly 202b is opposite from the first initiator assembly 202a (for example, on opposite sides of a central longitudinal axis of the fuselage 108). The striker(s) 204 is configured to interact with the initiating assembl(ies) 202 to output the canopy release signal during an emergency ejection event, as described herein.

It is to be understood that the terms first, second, and the like are merely for labeling purposes. For example, the first striker 204a can be the second striker 204b, or vice versa.

Figure 5:
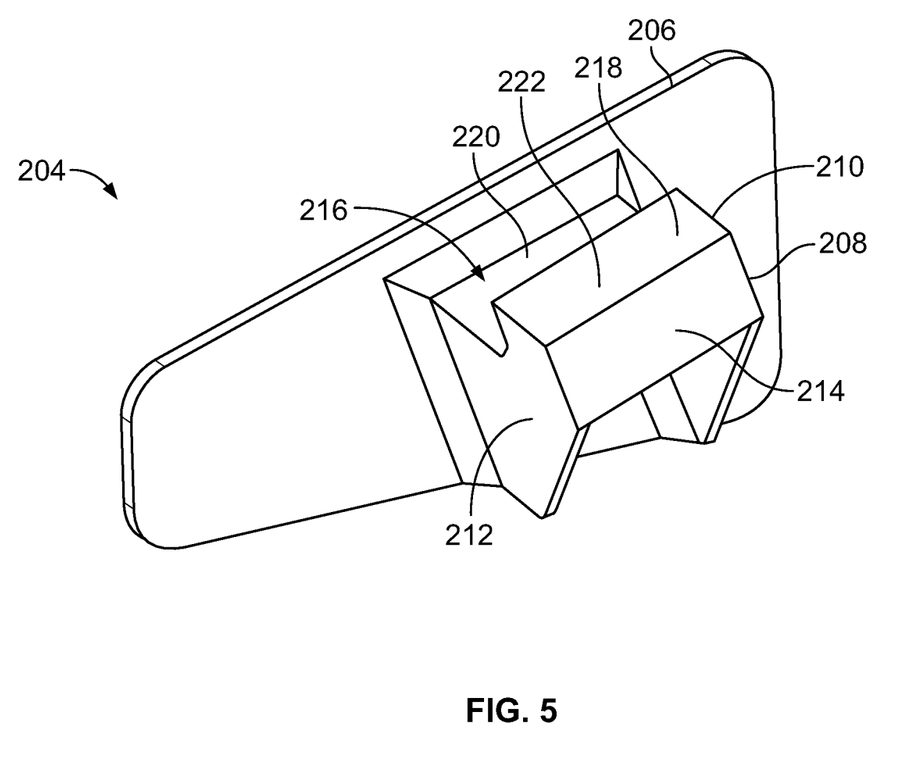
FIG. 5 illustrates a perspective view of a striker, according to an embodiment of the present disclosure.

FIG. 5 illustrates a perspective view of the striker 204, according to an embodiment of the present disclosure. The striker 204 includes a base 206, such as a flat plate. An engagement protuberance 208 outwardly extends from the base 206. The engagement protuberance 208 includes a fore wall 210 connected to an aft wall 212 through a lateral wall 214. A channel 216 longitudinally extends between and through the fore wall 210 and the aft wall 212. The channel 216 is outboard (that is, further away from the central plane 205 shown in FIG. 4) from a ledge 218. The ledge 218 is inboard (that is, closer to the central plane 205 shown in FIG. 4) from the channel 216. The ledge 218 extends to a height that is greater than an upper surface 220 of the engagement protuberance 208 that defines the channel 216. The ledge 218 extends above and inboard from the channel 216. The ledge 218 provides a striking face 222, such as an upper surface of the ledge 218.

Referring to FIGS. 4 and 5, the base 206 secures to a portion of the pivot assembly 140. For example, the base 206 secures to an interior surface of the first extension beam 150 (or an interior surface of the second extension beam 152). In at least one embodiment, the base 206 is securely fixed to the pivot assembly 140, such as through one or more fasteners, adhesives, and/or the like. In at least one other embodiment, the base 206, and therefore, the engagement protuberance 208, are integrally molded and formed with the portion of the pivot assembly 140.

Figure 6:
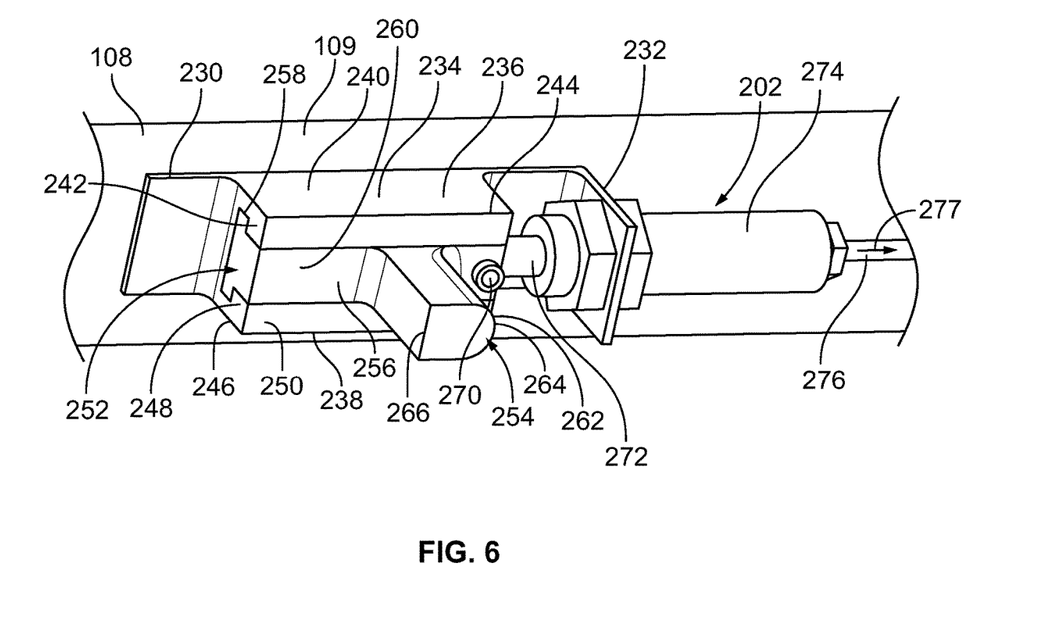
FIG. 6 illustrates a perspective view of an initiating assembly, according to an embodiment of the present disclosure.
Figure 7:
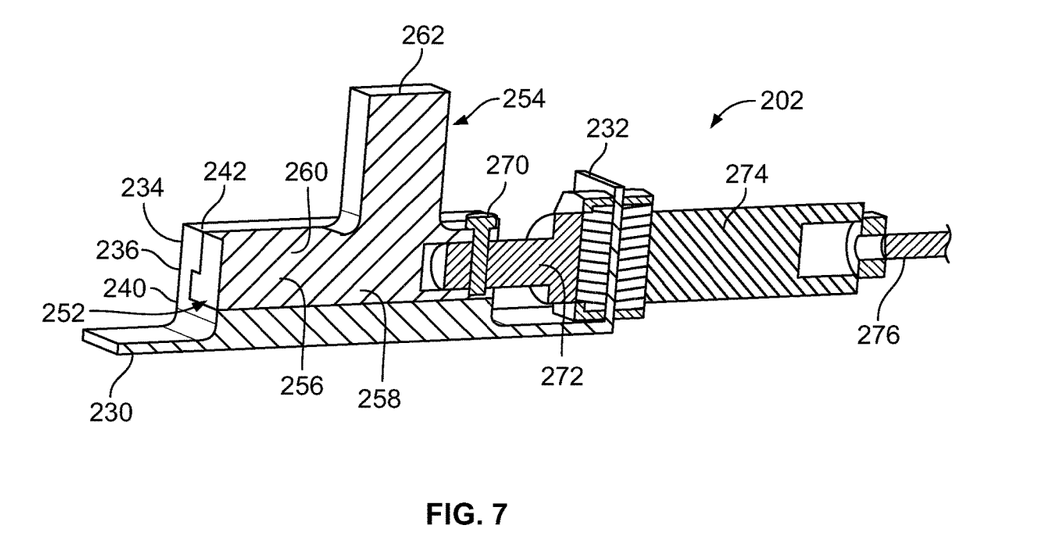
FIG. 7 illustrates a transverse cross-sectional view of the initiating assembly of FIG. 6.

FIG. 6 illustrates a perspective view of the initiating assembly 202, according to an embodiment of the present disclosure. FIG. 7 illustrates a transverse cross-sectional view of the initiating assembly 202 of FIG. 6. The initiating assembly 202 includes a base 230 that secures to an interior portion 109 of the fuselage 108, such as through one or more fasteners, adhesives, and/or the like. Optionally, the base 230 may be integrally molded and formed with the interior portion 109 of the fuselage 108.

A flange 232 outwardly (that is, in an outboard direction) extends from the base 230, such as at a right angle. A housing 234 outwardly (that is, in an outboard direction) extends from the base 230. The housing 234 includes an upper wall 236 spaced from a lower wall 238. The upper wall 236 includes an upper panel 240 and a ridge 242 downwardly extending from an outer edge 244 of the upper panel 240. Similarly, the lower wall 238 includes a lower panel 246 and a ridge 248 upwardly extending from an outer edge 250 of the lower panel 246. The upper wall 236 and the lower wall 238 mirror one another. The space between the upper wall 236 and the lower wall 238 provides a keyway 252.

A sliding bolt 254 is configured to slide within the keyway 252. The sliding bolt 254 includes a main longitudinal body 256 that is sized and shaped to fit within the keyway 252. For example, the main longitudinal body 256 includes an inboard portion 258 and an outboard portion 260. The inboard portion 258 is wider than the outboard portion 260 and fits behind the ridges 242 and 248, while the outboard portion 260 fits between the ridges 242 and 248. A protrusion 262, such as a block, outwardly extends from the outboard portion 260, such as in an inboard direction. The protrusion 262 can includes an arcuate fore face 264 and a blunted aft face 266. The protrusion 262 outwardly extends from the keyway 252 of the housing 234.

A pin 270 secures the sliding bolt 254 to a plunger 272 of an initiator 274 that extends through the flange 232. Optionally, the sliding bolt 254 can be integrally formed with the plunger 272. The initiator 274 is coupled to a signal transfer line 276. The canopy release signal 277 is output through the signal transfer line 276.

Figure 8:
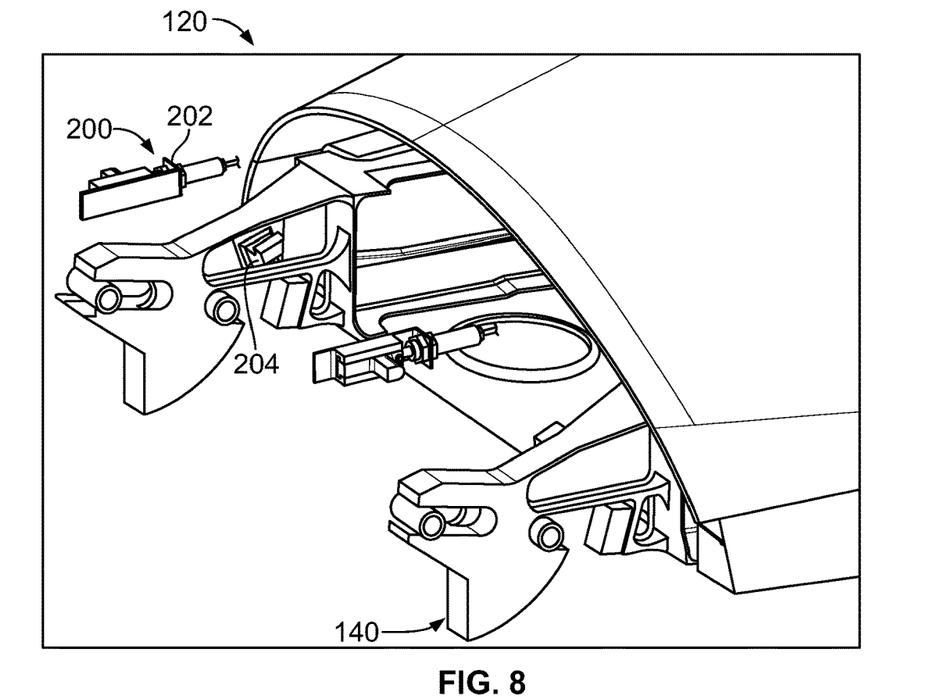
FIG. 8 illustrates a perspective view of the canopy in a down and locked position, according to an embodiment of the present disclosure.

FIG. 8 illustrates a perspective view of the canopy 120 in a down and locked position, according to an embodiment of the present disclosure. Referring to FIGS. 1-8, the canopy 120 is in the down and locked position prior to an ejection sequence being initiated. For example, before an occupant of the cockpit 114 pulls an ejection handle, the canopy 120 is in the down and locked position. In the down and clocked position, the striker 204 is separated from the initiating assembly 202.

Figure 9:
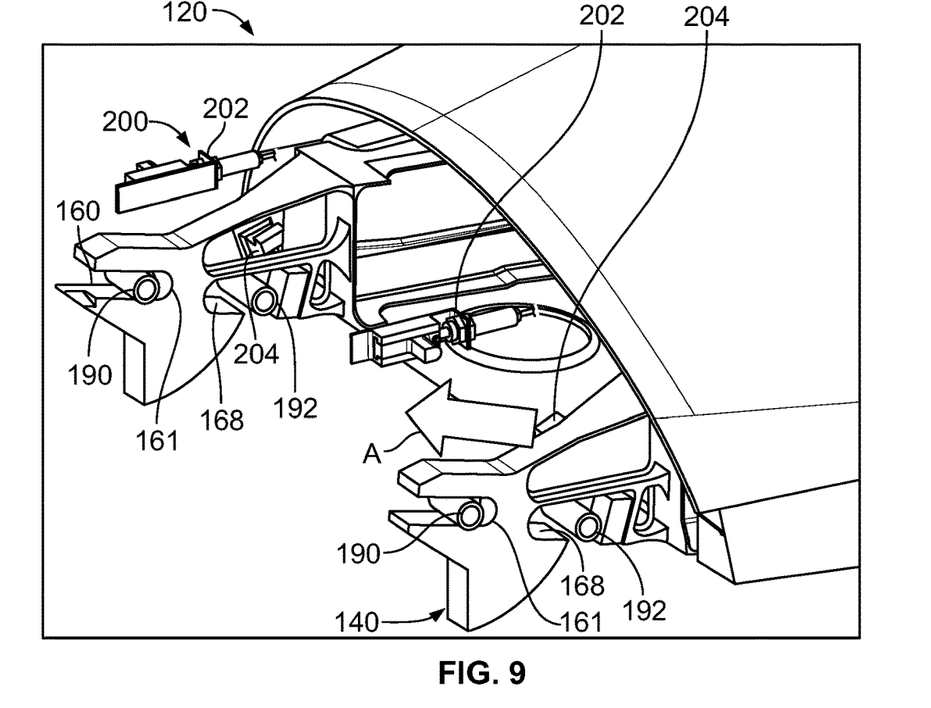
FIG. 9 illustrates a perspective view of the canopy in an unlocked position, according to an embodiment of the present disclosure.

FIG. 9 illustrates a perspective view of the canopy 120 in an unlocked position, according to an embodiment of the present disclosure. Referring to FIGS. 1-9, in response to the ejection sequence being initiated (such as by the occupant of the cockpit 114 pulling the ejection handle), the canopy 120 slides in an aft direction A relative to the fuselage 108. As such, the fore pins 192 slide out of the locking slots 168, and the aft pins 190 slide into pivot throats 161 of the pivot slots 160. The canopy 120 is now unlocked and free to rotate about the aft pins 190.

Figure 10:
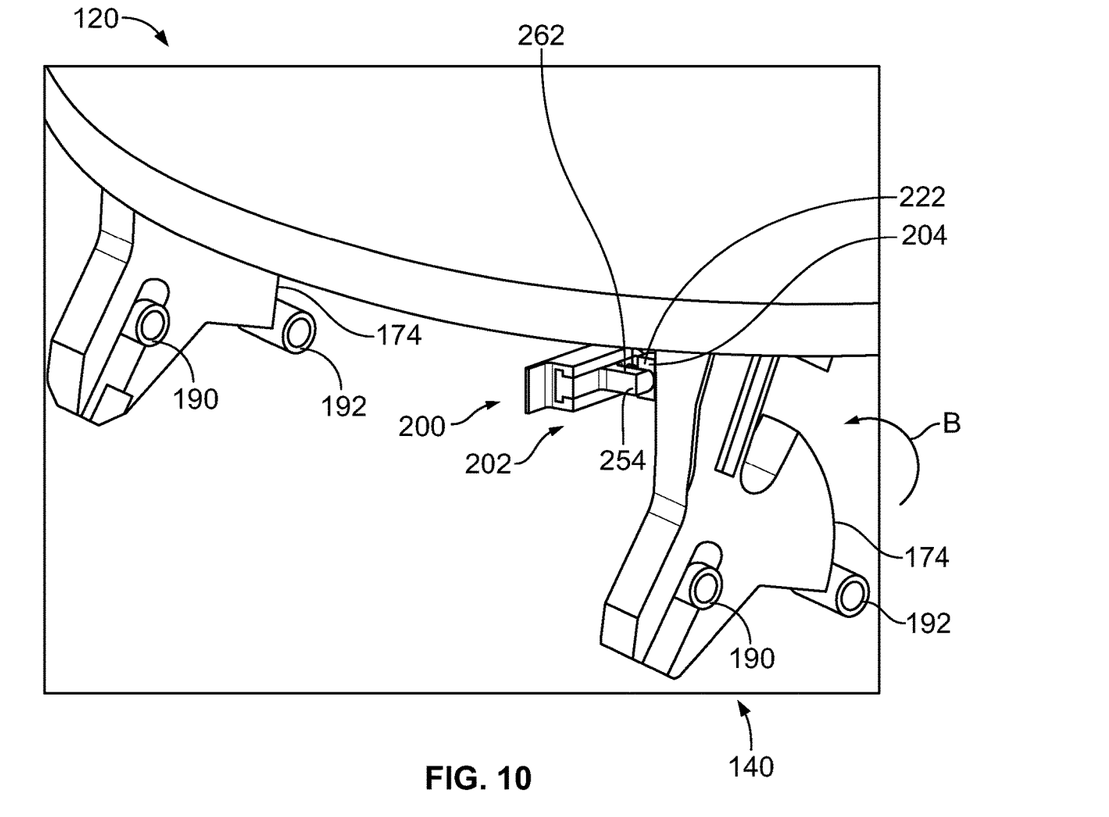
FIG. 10 illustrates a perspective view of the canopy in a pivoted position in which a system for initiating a canopy release signal is in an engaged position to output the canopy release signal, according to an embodiment of the present disclosure.
Figure 11:
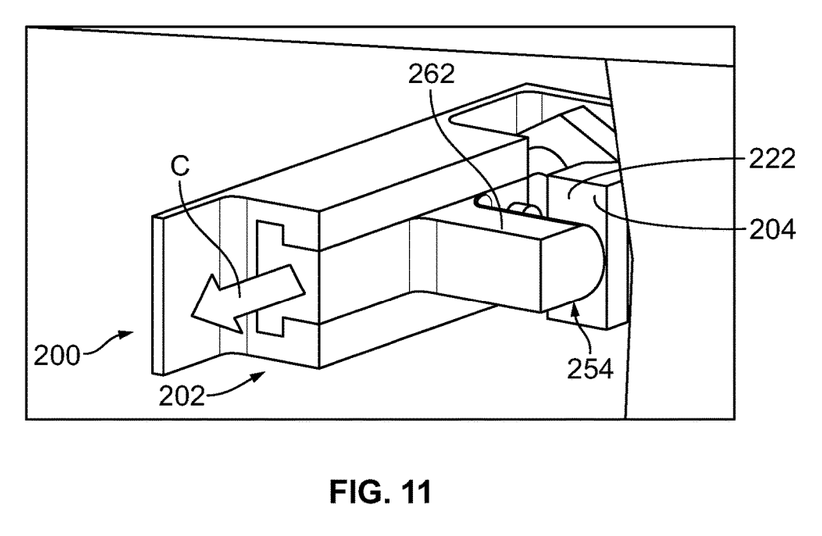
FIG. 11 illustrates a perspective aft view of the system for initiating the canopy release signal in the engaged position to output the canopy release signal.
Figure 12:
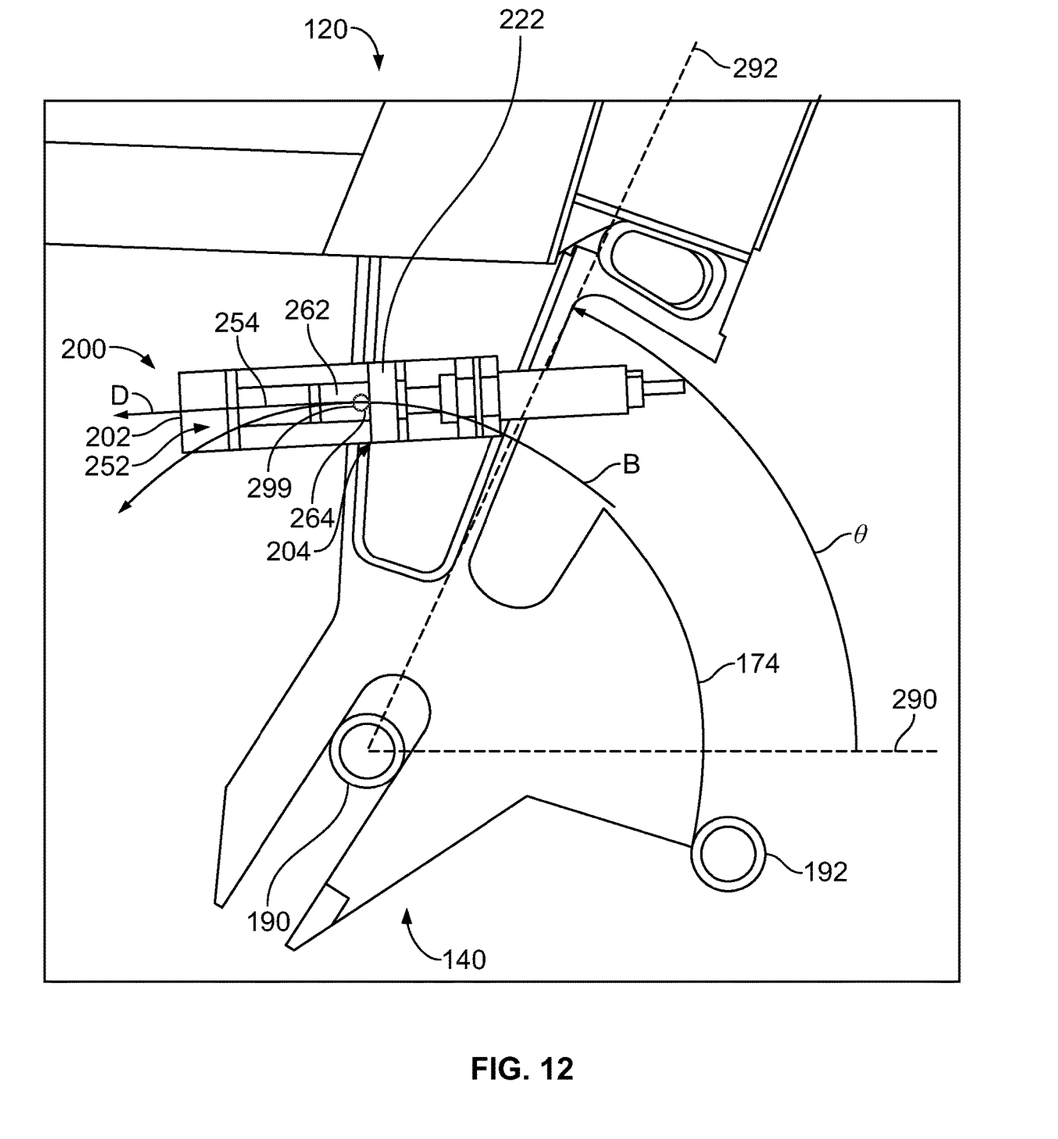
FIG. 12 illustrates a lateral view of the system for initiating the canopy release signal in the engaged position to output the canopy release signal.

FIG. 10 illustrates a perspective view of the canopy 120 in a pivoted position in which the system 200 for initiating the canopy release signal is in an engaged position to output the canopy release signal, according to an embodiment of the present disclosure. FIG. 11 illustrates a perspective aft view of the system 200 for initiating the canopy release signal in the engaged position to output the canopy release signal. FIG. 12 illustrates a lateral view of the system 200 for initiating the canopy release signal in the engaged position to output the canopy release signal. Referring to FIGS. 1-12, as the canopy 120 rotates about the aft pins 190 in the direction of arc B, the hinge cams 174 ride against the fore pins 192, thereby constraining portion to pure rotation about the aft pins 190. As the canopy 120 continues to rotate, at a release angle Θ (for example, "canopy gone" angle) the striking face 222 of the striker 204 engages (is forced into) the protrusion 262 of the sliding bolt 254. As the canopy 120 continues to rotate rearwardly in the direction of arc B, the striking face 222 pushes the protrusion rearwardly in the direction of arrow C, thereby causing the sliding bolt 254 to rearwardly slide through the keyway 252, which, in turn, pulls the plunger 272 in the same direction, and actuates the initiator 274 to send the canopy release signal via the signal transfer line 276. The canopy release signal indicates that the canopy 120 has cleared space over the cockpit 114, and that the escape path for the occupant and the seat is clear. Once the hinge cams 174 are free of the fore pins 192, the canopy 120 is no longer constrained to the fuselage 108 and is allowed to separate therefrom.

As shown in FIG. 12, the canopy release angle Θ is between a canopy locked reference line 290 (that is, a line in relation to the canopy 120 in the down and locked position, as shown in FIG. 8), and a release line 292, at which the striking face 222 of the striker 204 abuts into the arcuate fore face 264 of the protrusion 262 of the sliding bolt 254. The arcuate fore face 264 ensures that the striking face 222 of the striker 204 does not catch, bind, or the like on the protrusion 262, and ensures a linear sliding path D for the sliding bolt 254. The linear sliding path D is tangent to the arcuate sliding path B of the striker 204. At the initiation point 299 between the striking face 222 and the fore face 264, the keyway 252 is oriented tangent to the motion arc B of the striker 204 such that the force vector applied to the sliding bolt 254 is parallel to the sliding path of the sliding bolt 254 within the keyway 252 (thereby preventing side loading and excess friction within the keyway 252). In at least one embodiment, the canopy release angle Θ is between 72-90 degrees. For example, the canopy release angle Θ is 72.5 degrees.

Figure 13:
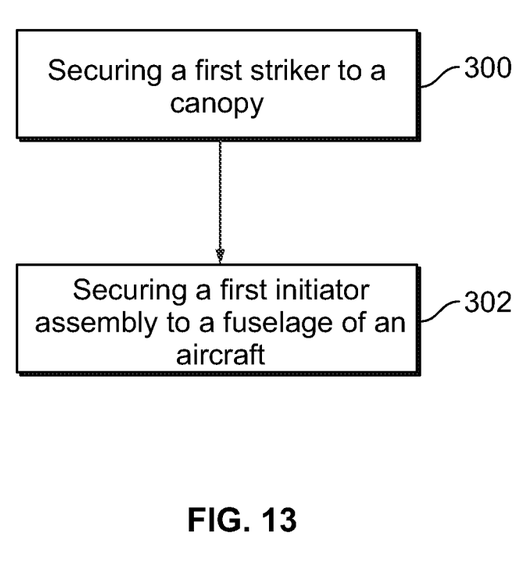
FIG. 13 illustrates a flow chart of a method for initiation of a canopy release signal for a canopy of an aircraft, according to an embodiment of the present disclosure.

FIG. 13 illustrates a flow chart of a method for initiation of a canopy release signal for a canopy of an aircraft, according to an embodiment of the present disclosure. The method includes securing, at 300, a first striker to the canopy; and securing, at 302, a first initiator assembly to a fuselage of the aircraft. The first initiator assembly has a protrusion. The first striker is configured to be rotated against the protrusion of the first initiator assembly. The canopy release signal is output in response to the first striker rotating against the protrusion of the first initiator assembly.

As a further example, the method also includes securing a second striker to the canopy, wherein the second striker is opposite from the first striker; and securing a second initiator assembly to the fuselage, wherein the second initiator assembly is opposite from the first initiator assembly.

As an example, said securing the first striker comprises securing the first striker to a pivot assembly of the canopy. As a further example, said securing the first striker further comprises securing the first striker to a first hinge of the pivot assembly.

In at least one embodiment, the method also includes providing the protrusion with an arcuate fore face, wherein the first striker is configured to be rotated against the arcuate fore face.

In at least one embodiment, the method further includes slidably retaining a sliding bolt of the first initiator assembly within a keyway of a housing, wherein the sliding bolt includes the protrusion. As a further example, the method includes coupling plunger of an initiator to the sliding bolt; and coupling a signal transfer line to the initiator, wherein the canopy release signal is output through the signal transfer line.

Further, the disclosure comprises embodiments according to the following clauses:

Clause 1. A system for initiating a canopy release signal for a canopy of an aircraft, the system comprising:
  a first striker secured to the canopy; and
  a first initiator assembly secured to a fuselage of the aircraft, the first initiator assembly having a protrusion,
    wherein the first striker is configured to be rotated against the protrusion of the first initiator assembly, and
    wherein the canopy release signal is output in response to the first striker rotating against the protrusion of the first initiator assembly.

Clause 2. The system of Clause 1, further comprising:
  a second striker secured to the canopy, wherein the second striker is opposite from the first striker; and
  a second initiator assembly secured to the fuselage, wherein the second initiator assembly is opposite from the first initiator assembly.

Clause 3. The system of Clauses 1 or 2, wherein the first striker is secured to a pivot assembly of the canopy.

Clause 4. The system of Clause 3, wherein the first striker is secured to a first hinge of the pivot assembly.

Clause 5. The system of any of Clauses 1-4, wherein the protrusion comprises an arcuate fore face, and wherein the first striker is configured to be rotated against the arcuate fore face.

Clause 6. The system of any of Clauses 1-5, wherein the first initiator assembly comprises:
  a housing defining a keyway; and
  a sliding bolt slidably retained within the keyway, wherein the sliding bolt includes the protrusion.

Clause 7. The system of Clause 6, wherein the first initiator assembly further comprises:
  an initiator having a plunger, wherein the plunger is coupled to the sliding bolt; and
  a signal transfer line coupled to the initiator, wherein the canopy release signal is output through the signal transfer line.

Clause 8. The system of Clause 7, wherein the striker is configured to push the protrusion rearwardly, thereby causing the sliding bolt to rearwardly slide through the keyway, which, in turn, pulls the plunger, and actuates the initiator to send the canopy release signal via the signal transfer line.

Clause 9. The system of any of Clauses 1-8, wherein the first striker rotates against the protrusion at a canopy release angle, and wherein the canopy release angle is between a canopy locked reference line and a release line.

Clause 10. The system of Clause 9, wherein the canopy release angle is 72.5 degrees.

Clause 11. A method for initiation of a canopy release signal for a canopy of an aircraft, the method comprising:
  securing a first striker to the canopy; and
  securing a first initiator assembly to a fuselage of the aircraft, the first initiator assembly having a protrusion,
    wherein the first striker is configured to be rotated against the protrusion of the first initiator assembly, and
    wherein the canopy release signal is output in response to the first striker rotating against the protrusion of the first initiator assembly.

Clause 12. The method of claim of Clause 11, further comprising:
  securing a second striker to the canopy, wherein the second striker is opposite from the first striker; and
  securing a second initiator assembly to the fuselage, wherein the second initiator assembly is opposite from the first initiator assembly.

Clause 13. The method of Clauses 11 or 12, wherein said securing the first striker comprises securing the first striker to a pivot assembly of the canopy.

Clause 14. The method of Clause 13, wherein said securing the first striker further comprises securing the first striker to a first hinge of the pivot assembly.

Clause 15. The method of any of Clauses 11-14, further comprising providing the protrusion with an arcuate fore face, wherein the first striker is configured to be rotated against the arcuate fore face.

Clause 16. The method of any of Clauses 11-15, further comprising slidably retaining a sliding bolt of the first initiator assembly within a keyway of a housing, wherein the sliding bolt includes the protrusion.

Clause 17. The method of Clause 16, further comprising:
  coupling plunger of an initiator to the sliding bolt; and
  coupling a signal transfer line to the initiator, wherein the canopy release signal is output through the signal transfer line.

Clause 18. An aircraft comprising:
  a fuselage;
  a canopy moveably coupled to the fuselage, wherein the canopy is configured to be move between an open position and closed position, the canopy comprising a transparent cover secured to a frame, and a pivot assembly extending from the frame; and
  a system for initiating a canopy release signal for the canopy of the aircraft, the system comprising:
    a first striker secured to the canopy; and
    a first initiator assembly secured to the fuselage of the aircraft, the first initiator assembly having a protrusion, wherein the protrusion comprises an arcuate fore face,
      wherein the first striker is configured to be rotated against the arcuate fore face of the protrusion at a canopy release angle between a canopy locked reference line and a release line, and
      wherein the canopy release signal is output in response to the first striker rotating against the protrusion of the first initiator assembly.

Clause 19. The aircraft of Clause 18, wherein the system further comprises:
  a second striker secured to the canopy, wherein the second striker is opposite from the first striker; and
  a second initiator assembly secured to the fuselage, wherein the second initiator assembly is opposite from the first initiator assembly.

Clause 20. The aircraft of Clauses 18 or 19, wherein the first initiator assembly comprises:
  a housing defining a keyway;
  a sliding bolt slidably retained within the keyway, wherein the sliding bolt includes the protrusion;
  an initiator having a plunger, wherein the plunger is coupled to the sliding bolt; and
  a signal transfer line coupled to the initiator, wherein the canopy release signal is output through the signal transfer line,
    wherein the striker is configured to push the protrusion rearwardly, thereby causing the sliding bolt to rearwardly slide through the keyway, which, in turn, pulls the plunger, and actuates the initiator to send the canopy release signal via the signal transfer line.

As described herein, embodiments of the present disclosure provide systems and methods for effectively and accurately outputting a signal indicating that a canopy has cleared a space for ejecting a seat from a cockpit of an aircraft during an emergency ejection procedure. Further, embodiments of the present disclosure provide systems and methods that are not susceptible to a potential of other structures of an aircraft interfering therewith during operation.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for initiating a canopy release signal for a canopy of an aircraft, the system comprising:
   a first striker secured to the canopy; and
   a first initiator assembly secured to a fuselage of the aircraft, the first initiator assembly comprising:
   a housing defining a keyway;
   a sliding bolt slidably retained within the keyway, wherein the sliding bolt includes a protrusion having an arcuate fore face;
   an initiator having a plunger, wherein the plunger is coupled to the sliding bolt; and
   a signal transfer line coupled to the initiator, wherein the canopy release signal is output through the signal transfer line;
   wherein the first striker is configured to be rotated into the protrusion of the first initiator assembly, thereby pushing the protrusion rearwardly, causing the sliding bolt to rearwardly slide through the keyway, which, in turn, pulls the plunger, and actuates the initiator to send the canopy release signal via the signal transfer line.

2. The system of claim 1, further comprising:
   a second striker secured to the canopy, wherein the second striker is opposite from the first striker; and
   a second initiator assembly secured to the fuselage, wherein the second initiator assembly is opposite from the first initiator assembly.

3. The system of claim 1, wherein the first striker is secured to a pivot assembly of the canopy.

4. The system of claim 3, wherein the first striker is secured to a first hinge of the pivot assembly.

5. The system of claim 1, wherein the first striker rotates into the protrusion at a canopy release angle, and wherein the canopy release angle is between a canopy locked reference line and a release line.

6. The system of claim 5, wherein the canopy release angle is 72.5 degrees.

7. A method for initiation of a canopy release signal for a canopy of an aircraft, the method comprising:
   securing a first striker to the canopy; and
   securing a first initiator assembly to a fuselage of the aircraft, the first initiator assembly having a protrusion;
   slidably retaining a sliding bolt of the first initiator assembly within a keyway of a housing, wherein the sliding bolt includes the protrusion;
   coupling a plunger of an initiator to the sliding bolt;
   coupling a signal transfer line to the initiator, wherein the canopy release signal is output through the signal transfer line;
   wherein the first striker is configured to be rotated into the protrusion of the first initiator assembly, thereby pushing the protrusion rearwardly, causing the sliding bolt to rearwardly slide through the keyway, which, in turn, pulls the plunger, and actuates the initiator to send the canopy release signal via the signal transfer line.

8. The method of claim of claim 7, further comprising:
   securing a second striker to the canopy, wherein the second striker is opposite from the first striker; and
   securing a second initiator assembly to the fuselage, wherein the second initiator assembly is opposite from the first initiator assembly.

9. The method of claim 7, wherein said securing the first striker comprises securing the first striker to a pivot assembly of the canopy.

10. The method of claim 9, wherein said securing the first striker further comprises securing the first striker to a first hinge of the pivot assembly.

11. An aircraft comprising:
    a fuselage;
    a canopy moveably coupled to the fuselage, wherein the canopy is configured to move between an open position and closed position, the canopy comprising a transparent cover secured to a frame, and a pivot assembly extending from the frame; and a system for initiating a canopy release signal for the canopy of the aircraft, the system comprising:
  a first striker secured to the canopy; and
  a first initiator assembly secured to the fuselage of the aircraft, the first initiator assembly comprising:
    a housing defining a keyway;
    a sliding bolt slidably retained within the keyway, wherein the sliding bolt includes a protrusion having an arcuate fore face;
    an initiator having a plunger, wherein the plunger is coupled to the sliding bolt; and
    a signal transfer line coupled to the initiator, wherein the canopy release signal is output through the signal transfer line;
wherein the first striker is configured to be rotated into the arcuate fore face of the protrusion at a canopy release angle between a canopy locked reference line and a release line, thereby pushing the protrusion rearwardly, causing the sliding bolt to rearwardly slide through the keyway, which, in turn, pulls the plunger, and actuates the initiator to send the canopy release signal via the signal transfer line.

12. The aircraft of claim 11, wherein the system further comprises:
  a second striker secured to the canopy, wherein the second striker is opposite from the first striker; and
  a second initiator assembly secured to the fuselage, wherein the second initiator assembly is opposite from the first initiator assembly.

13. The system of claim 1, wherein the first striker is configured to be rotated into the arcuate fore face.

14. The method of claim 7, further comprising providing the protrusion with an arcuate fore face, wherein the first striker is configured to be rotated into the arcuate fore face.

\* \* \* \* \*